United States Patent Office 3,794,467
Patented Feb. 26, 1974

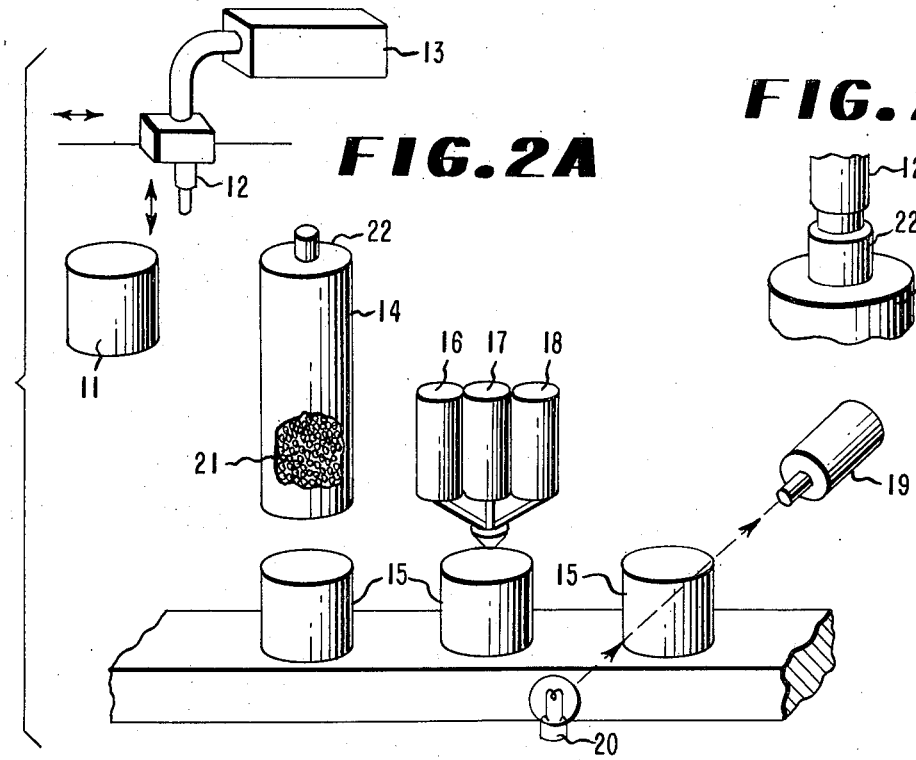
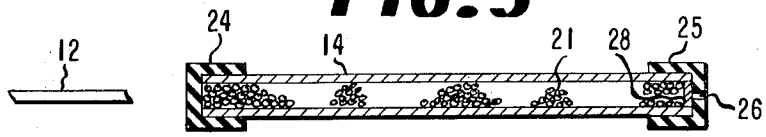
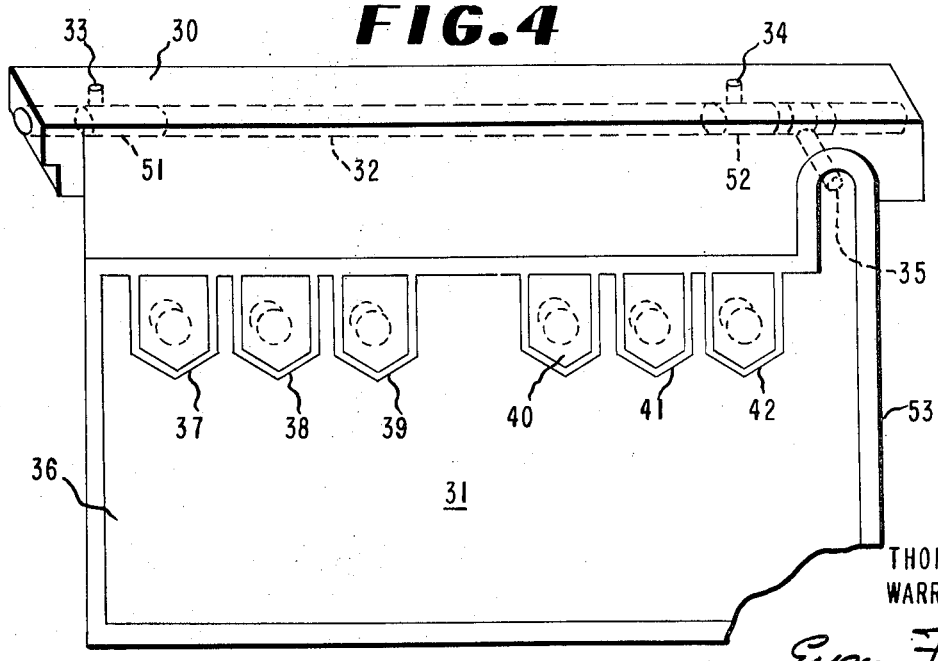

3,794,467
REMOVING SUBSTANCES FROM A LIQUID BY PRECIPITATION IN POROUS GLASS BEADS
Thomas H. Adams, Newark, and Warren K. Miller, Wilmington, Del., assignors to E. I. du Pont de Nemours and Company, Wilmington, Del.
Filed Oct. 28, 1971, Ser. No. 193,475
Int. Cl. G01n *31/02, 33/16*
U.S. Cl. 23—230 R     16 Claims

ABSTRACT OF THE DISCLOSURE

A method and device for removing substances from a liquid sample. The device involves a receptacle containing porous particles and an agent that will precipitate the substance to be removed. The porous particles retain any precipitate formed. Also included is a method and apparatus for analyzing a liquid sample for a particular constituent where interfering substances may be present. The method comprises forcing substantially all of the sample through porous particles containing a liquid that will effect precipitation of the interfering substance and into a reaction chamber and determining the presence of the particular constituent. The liquid within the porous particles is chosen to precipitate substantially all of the interfering substance from the sample without removing substantially any of the particular constituent. Normally at least one reagent reactive with the particular constituent must be introduced into the liquid sample before the determination is made.

CROSS REFERENCES TO RELATED APPLICATIONS

This invention is related to U.S. Pat. 3,476,515 for an Analytic Test Pack, issued to D. R. Johnson et al. which discloses an analytic test pack which can contain some of the elements of the present invention. It also relates to U.S. patent application Ser. No. 753,197 for an Automatic Clinical Analyzer, filed on Aug. 16, 1968 by D. R. Johnson et al. which shows an instrument that can perform the method of the present invention; and to U.S. Pat. 3,612,360 for an Apparatus and Method for Fluid Handling and Sampling, issued on Oct. 12, 1971, by W. J. Ambrose et al. in that the device disclosed therein is useful as the liquid handling means of the present invention.

BACKGROUND OF THE INVENTION

Photometric analysis of liquid samples is well known in chemical analysis, particularly in clinical areas where the need for rapid assays of body fluids has led to automated instruments performing a series of analytic tests. Most of these instruments employ well-known biochemical tests to determine the presence or absence of a particular constituent in a liquid sample. In these tests, a reagent, which will induce a reaction in the presence of the particular constituent, is introduced into the liquid. The induced reaction affects the photometric density of the liquid sample which is detected by a photometer. Tests for urea nitrogen and blood glucose, set forth in the examples to U.S. Pat. 3,476,515, represent common examples of this type of analysis.

In some instances, however, these tests lose their effectiveness because the reagents also react with substances present in the sample. These reactions usually make photometric analysis unreliable by producing a precipitate which clouds the liquid. The problem is particularly prevalent for body fluids, where the interfering substances are usually proteins. Consequently, many routine analytic tests require the chemical removal of proteins from the sample prior to analysis.

When the analysis is performed manually, the removal of interfering substances can often be accomplished by precipitation and centrifugation. However, with centrifugation, a firm pellet does not always form, making decantation of the supernatant difficult. Often a film may develop which floats on the top. Also, centrifugation requires two sampling steps, one before and one after the actual centrifugation; this additional sampling introduces further likelihood of erroneous quantitative results. Further, centrifugation is impractical for automatic instruments.

Filtering may also remove precipitates from a liquid. In filtration, however, solutes can be lost by adsorption onto the filter paper or precipitate. Also, as in centrifugation, filtration generally requires two sampling steps, which enhances the possibility of inaccurate quantitative results. Further, the filter paper is a source of contamination requiring periodic replacement, and a small pinhole therethrough renders it inoperative.

Columns of ion exchange resin and hydroxylapatite have been used in U.S. patent applications Ser. No. 851,409 filed on Aug. 19, 1969 by W. W. Luchsinger et al. and Ser. No. 174,802 filed on Aug. 25, 1971 by J. S. Thompson to remove charged particles and macromolecules, respectively, in automated instruments. However, the ion exchange resin will retain other substances having a charge similar to the substance to be removed and cannot remove neutral molecules. Hydroxylapatite suffers from the similar limitations that it will retain other molecules having the same size and charge as the undesired substance and cannot remove small, neutral species.

Glass beads have been previously used to soften water and filter particulate matter out of solutions. However, such beads have been solid or at least have had an impervious core. As a result, they are limited to removing substances sufficiently large to become entrapped between the glass beads or substances which actually deposit upon the surface of the beads. However, these beads will not remove from solutions small molecules or particles which do not deposit upon the surface of the beads themselves.

The early development of automatic analysis instruments recognized the need for an automatic method to remove undesired substances. L. T. Skeggs in U.S. Pat. 2,797,149 incorporated a dialysis apparatus which removes "crystalloid" constituents from a solution of "crystalloid" and "non-crystalloid" (or colloidal) constituents, in proportion to the ratio of crystalloid substance in the liquid. This technique depends on a more or less continuous flow of the sample liqud and is, therefore, impractical for batch analysis. Additionally, the technique displays several positive disadvantages. Dialysis depends upon the diffusion of crystalloid constituents through a semi-permeable membrane, which represents a slow process. As a result, more sample than required for the analysis must be introduced into the instrument for a sufficient amount to pass through the membrane in a reasonable length of time. Also, since the diffusion rates of different macromolecules differ, the amount of each macromolecule removed is difficult to standardize. Additionally, the removed substance is not collected together in a form that will permit washing and assure quantitatively accurate results. Finally, the membrane suffers from the defects of a filter in that it provides a source of contamination, and a hole leaves it useless.

SUMMARY OF THE INVENTION

Substances which have the capability of forming a precipitate with other materials may be removed from a liquid sample by passing the sample through substantially rigid porous particles which at least fill a portion of a receptacle. Prior to passing the sample through the particles, the spaces between and within the pores of the particles should contain a precipitating agent for the undesired substance to be removed, that is, a material that will cause its precipitation. The precipitating agent effects the precipitation of the undesired substance and the porous particles entrap the precipitate thus formed.

The porous quality of the particles serves two important functions. First, they assist in retaining the precipitate formed from the undesired substance. Second, they engender mixing between the liquid sample and the precipitating agent. This assumes particular significance when the precipitating agent is liquid. The mixing breaks down the boundary layer formed between the liquid sample and the solution containing the precipitating agent. Presumably the particles' porosity creates turbulence within the liquids as they pass through the particles. Also, the surfaces of the pores retain an amount of the liquid precipitating agent which then makes contact with the sample as it passes through them.

The filtering of a precipitate upon a paper or the retention of a solute behind a dialysis membrane requires that the separating paper or membrane remain intact with no hole or rend developing in them. However such hole or rends do tend to develop in these because of their laminer structure, with the result that interfering substances pass through the paper or membrane and contaminate the sample. However, the retention of a precipitate by the porous particles derives from the fact that the particles occupy and fill a volume within a receptacle. Thus, the opportunity for a hole to develop as within a film is not present, and, thus, this source of contamination is removed. Should a collapse of the structure of the porous particles actually occur (although their substantially rigid structure should preclude this), the net effect would be to reduce the pore size and the interstitial volume between the particles and thus enhance the particles' capability of retaining a precipitate. This is especially important when pressure is used to force the liquid through the filtering mechanism since it is frequently used to increase the speed of automated analysis and has a greater tendency to produce holes in filter papers or dialysis membranes causing them to lose their effectiveness.

Further, the use of porous particles involves only one sampling step. A specified amount may be taken from the liquid to be purified and this entire amount (less the precipitate) forced through the particles and recovered for the subsequent analysis. Moreover, the precipitate which is entrapped by the particles may be washed with a specified quantity of diluent and the combined specified amounts of liquid quantitatively analyzed after the purification.

Purifying the liquid sample by passing it through porous beads containing a precipitating agent promotes accurate analysis on the purified sample in another manner. Particles of precipitate are formed *while* the liquid sample passes through the porous beads. This gives the solute molecules, which are not to be precipitated, a chance to escape from the precipitate by passing through the beads while the precipitate is being formed. The solute molecules move downstream from the precipitate while the precipitate is being formed. This avoids the necessity of the solute molecules passing through the formed precipitate as occurs on filter paper. It precludes the solute molecules from being entrapped by an attempt to force them through the precipitate, and produces more quantitatively accurate results.

Often, specific undesired substances must be removed, while substantially all of other constituents must remain within the sample liquid. The specificity of the removal using porous particles depends upon the specificity of the liquid precipitating agent for the substance to be removed. However, precipitation represents a chemical reaction and demonstrates greater specificity than the classification based upon charge and size achieved with ion exchange resins and hydroxylapatite.

When the porous particles are used in automated analyses the method comprises forcing substantially all of the sample through particles containing a liquid precipitating agent to remove substantially all the undesired substance; subsequently depositing the sample into a reaction chamber; and determining the particular constituent. Prior to the determination, reagents which will initiate a reaction with the particular constituent must usually be introduced into the liquid sample. When this reaction affects the photometric density of the liquid sample, the determination can be made photometrically.

The automated apparatus comprises substantially rigid porous particles, with the spaces within the pores of and between the particles being filled with a liquid precipitating agent for an interfering substance; a sampling means for removing the liquid sample from its original container and forcing substantially all of it through the porous particles into the reaction chamber; and means for analyzing the liquid sample. Usually, reaction initiating means are also included. In one embodiment, the liquid sample is forced through the porous particles by introducing a diluent behind the sample. This diluent displaces substantially all of the sample and a quantity of the liquid precipitating agent into the reaction chamber. Since substantially all of the sample passes through the particles, to the analysis stage, and not just a portion, a single sampling step is involved and a smaller initial amount of sample can be used. Additionally, since the porous particles can be in the form of a small inexpensive cartridge, the liquid sample can be introduced into the automatic instrument through a disposable cartridge which eliminates the problem of contamination.

The present analytical method has the inherent advantage, especially in conjunction with an automatic instrument, that no intermediate removal and recovery steps are necessary. The liquid sample is passed directly through the porous particles into the reaction chamber. However, any process for removing interfering substances using porous particles which is to be integrated into an automatic instrument, must deal with at least two problems. First, the method must remove substantially all of the unwanted substance within the limits of space and time set by the instrument. The bed of particles, through which the liquid sample passes, can only be a few inches long, if it is to be physically integrated into an instrument. Further, the time required for the sample to pass through the bed of particles cannot exceed a few minutes without significantly decreasing instrumental efficiency.

Second, the liquid sample must be presented to the reaction chamber in a form suitable for analysis by an automated procedure, which inherently must deal with precise predetermined volumes and concentrations of sample and reagents. Normally, the sample liquid is mixed with a diluent before the reagents are added. If the means used to remove the interfering substance alters the sample concentration in an unpredictable way, the analysis cannot proceed automatically with accuracy.

By the practice of the present invention, substantial removal of the interfering substance is accomplished by using porous particles containing a liquid which acts as a precipitating agent only for the undesired substance so that the remaining sample will pass through unaffected. A short column of porous particles with the precipitating agent will effectively remove substantially all of the undesired material, and, by forcing the liquid sample through the short column under pressure, the entire liquid sample can be passed through the column in less than two minutes. The sample is usually forced through the column by using a diluent under pressure. If the proper amount of diluent is used, all the liquid sample and a known amount of the diluent as well as a known amount of the liquid precipitating agent is passed into the reaction chamber, leaving no uncertainty in the concentration properties of the mixture in the reaction chamber.

BRIEF DESCRIPTION OF THE DRAWINGS

FIG. 2 is a schematic diagram of a simple embodiment of an automatic analysis instrument which can be used in the practice of the present invention;

FIG. 3 is a cross-sectional view of a glass bead column which can be used in an automatic analysis instrument, such as the one shown in FIG. 2; and FIG. 4 is a diagram of an analytic test pack, for use in the practice of the present invention in an automatic analytic instrument.

DETAILED DESCRIPTION OF THE INVENTION

Figure 1:
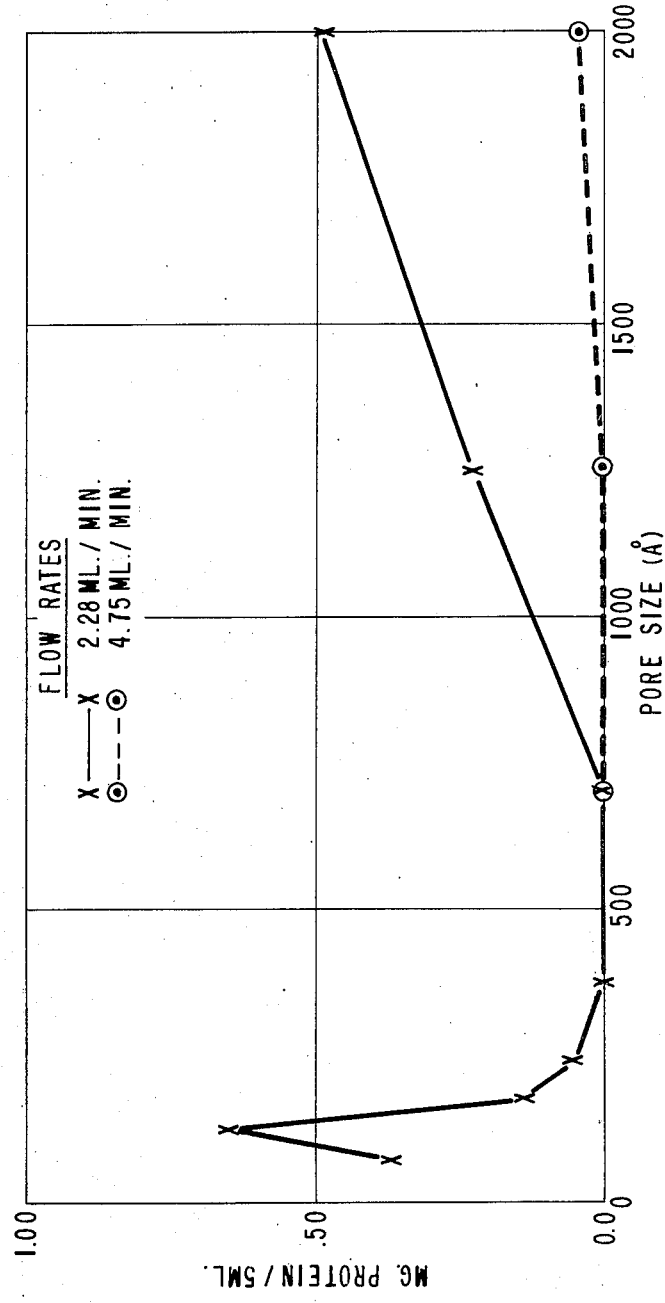
FIG. 1 shows the effectiveness of a porous glass bead column in removing proteins as a function of the pore size.

In order to use the porous particles to remove undesired substances, they are placed in a receptacle that permits the passage of the liquid sample through them. A hollow column having one or both of their ends covered by a sieve that will prevent the escape of the porous particles from the column represents a particularly convenient type of receptacle. Other types include, for example, a funnel. All that is required is that the receptacle contain a bed of the particles in a configuration that permits the passage of the liquid sample through them.

The porous particles serve two primary functions in the removal of the undesired substances. They assist in the mixing of the liquid sample and the liquid precipitating agent, and also serve to retain the particles of precipitate formed from the undesired substrates. The pores represent the critical feature of the particles. They must be sufficiently large to allow both the passage of the liquid sample and the entry of the precipitate and sufficiently small to both engender the mixing and retain the precipitate. Particles having a pore size within the range of about 175 to 1250 A have effectively performed both functions. These do not represent absolute limits, however. Thus, particles supplied under the trade name of Controlled-Pore Glass (CPG-10) particles (sold by Corning Company of Corning, N.Y.) having a *nominal* pore diameter within this range would suffice although, as Table I shows, the nominal pore diameter of the particles does not necessarily represent the mean pore diameter.

TABLE I

| Nominal pore diameter, A.: | Range of mean pore diameter A. |
| --- | --- |
| 75 | 60–90 |
| 125 | 100–150 |
| 175 | 150–200 |
| 240 | 200–275 |
| 370 | 315–425 |
| 550 | 495–605 |
| 700 | 630–770 |
| 1250 | 1125–1375 |
| 2000 | 1800–2200 |

Furthermore, the supplier of these particles only requires 80 percent of the pores to be within ±10 percent of the mean pore diameter. However, these particles still perform the desired functions.

The maximum dimension of the porous particles should be about 37 to 125 microns. Significantly larger particles will result in interstitial spaces sufficiently large that contaminants and precipitate may pass through and contaminate the presumably purified sample. Significantly smaller particles have a propensity of being difficult to handle and retain on the sieve. They also reduce the flow rate of the sample.

The porous particles need have no particular shape. However, a spherical shape imparts a free-flowing property to them which produces greater ease in packing them into the receptacle. The particles, however, should be substantially rigid in order to retain their shape under the weight of the liquid and withstand the force of the liquids passing through them, especially if the liquids are forced through under pressure, which automatic instruments often use in the range of about 1 to 100 p.s.i. A preferred form of particles satisfying these requirements and preferencies are the Controlled-Pore Glass beads sold by Corning® under the designation CPG-10. These beads have, however, an irregular shape and come in various sizes of particles and pores.

Any material that effects the desired degree of precipitation of the undesired substance will suffice as the precipitating agent. At times, small amounts of the desired substance will not interfere with the subsequent use or analysis of the sample. Accordingly, a suitable precipitating agent need not precipitate all of the undesired substance but will suffice if it removes enough of the substance so that the remaining amount would be tolerable for the subsequent use or analysis. The precipitating agent may be a solid dispersed between the particle and within the pores, a pure solvent which will remove the undesired substance, or a solution, the solute of which effects the precipitation.

When the object of the purification is merely the removal of the undesired substance, any precipitating agent that effects this will suffice. However, in cases where it is desired to remove an undesired substance but leave other substances remaining within, it is necessary to choose, if available, a precipitating agent that will precipitate the undesired substance but not affect the other substances which must remain within the solution. This latter situation is met for example when analyses are subsequently performed for these substances. The unavailability of an agent to precipitate the undesired substance renders this method unsuitable.

The removal of proteins find increasingly greater use due to the recent development of automated procedures for clinical analyses in which proteins interfere with the analyses. As there are many precipitating agents for proteins, the present method and device is particularly useful for their removal. Some of the substances known to precipitate proteins include organic solvents that are pure or contain solutes, and aqueous solutions having heavy metal ions, high salt concentrations, or anionic precipitants. Examples of these, respectively, include acetone and ethanol; ammonium sulfate solutions; solutions having mercuric, ferric, zinc, cadmium, lead, or cupric ions; and trichloroacetic, tungstic, metaphosphoric, and perchloric acids.

In the automated apparatus of FIG. 2, the sample liquid is initially in the sample container 11. A portion of the liquid sample is drawn from this container into probe 12 under the action of pump 13, and discharged into the porous bead column 14 under sufficient pressure to cause it to pass entirely through the beads 21 (greatly magnified) and to be discharged within a short period of time into reaction chamber 15. One way to insure that all of the liquid sample passes through the column is to have the pump draw in sufficient diluent before the sample, so that the sample will be forced through the column, by the diluent behind it. When the bead column contains a dry precipitant, the column may first be saturated with a quantity of liquid. Then, the pump 13 may draw into the probe a quantity of diluent which is the same or different liquid from that previously placed in the column. Then the desired amount of sample is drawn into the probe behind the diluent. When the contents of the probe is injected into the column, the liquid sample is discharged into the column first, followed by the diluent.

When either a liquid precipitating agent or a dry precipitating agent that has been first saturated with some liquid is used, the introduction of the liquid from the probe into the column displaces the liquid already there. If the quantity of diluent in the probe is greater than the quantity of liquid originally in the column, the injection of the probe contents into the column first displaces the liquid from the column, then the liquid sample, followed by that portion of the diluent which exceeds the saturation capacity of the column. At the end of the pumping action, substantially all of the liquid sample and a total quantity of diluent plus liquid equivalent to the second quantity of diluent are discharged into the reaction chamber. Thus, the precise amount of liquid in the reaction chamber and consequently the sample concentration can be controlled.

Various reagents from chambers 16, 17 and 18 are then introduced into the reaction chamber to initiate a reaction. The opacity of the liquid in the reaction chamber after a set time or its change in opacity over a set period of time, is measured photometrically by irradiating the liquid with the light source 20 and monitoring the intensity of transmitted light with the photometer 19.

The variations on the simple automated analysis apparatus of FIG. 2 are numerous and well known. They include variations on the method of transferring the liquid from the sample container to the reaction chamber; variations on the method of introducing the reagents; variations on the method of photometrically analyzing the liquid; and innumerable intermediate conditioning steps. Two variations deserve mention, however. In some instances, the change in the liquid that is monitored occurs automatically and needs not to be induced. This obviates the introduction of a reagent into the reaction chamber. Also, while photometric analysis is the normal procedure for determining the particular constituent, other analytic procedures, such as colorimetric analysis, can be envisioned.

One instrument particularly well adapted for the above methods is described in U.S. patent application Ser. No. 753,197. U.S. Pat. 3,612,360 describes a particular sample transfer device which is also well suited for these methods.

When the porous bead column is for use in an automatic instrument, the sample must pass through the beads and the interfering substance removed in a time period short enough to be consistent with the other operative steps of the instrument. Most analytic instruments are designed to complete their analysis in 10 to 20 minutes. Thus, the sample can spend no more than a few (preferably two) minutes in the beads. To lengthen this time period would substantially impair the time-saving features of the automated instrument. To avoid this, the column used in the present invention has been materially shortened and the sample forced through the column under pressure, preferably in the range of 1 to 10 p.s.i. Accordingly, to achieve the pressure, a pump must be used to force the liquid directly into the column. Further the path from the pump to the discharge port and into the reaction chamber must be substantially leak tight, so that the pressure developed by the pump forces the liquid through the column and does not dissipate through leaks. As illustrated in FIG. 2, the column is a tube with an entrance port 22 which is designed to mate in some leaktight manner with probe 12.

FIG. 3 illustrates a simple column 14 containing porous beads 21, which can be used in the present invention. Tube 14 is capped by two rubber caps 24 and 25, one of which has an exit port 26 in it. Probe 12, in this configuration, is a hypodermic needle which can be inserted through rubber dam 24 to form a leak-tight connection between itself and the column. Liquid is forced through the probe directly through the column 14 and out exit 26 into the reaction chamber.

FIG. 4 illustrates an analytic test pack in which a porous bead column, a reaction chamber, and the reagents to be introduced into the reaction chamber, are all contained in the same package. The pack is described in U.S. Pat. 3,476,515 issued to D. R. Johnson et al. It consists of a rigid header 30, attached to which is a pouch 31 made from a transparent plastic material. The header contains the porous bead column 32 with an entrance port 33 located at one end and an exit port 35 located at the other end. The column is capped by rubber caps 51 and 52 so that a hypodermic needle can be inserted in port 33. The operation of the column is similar to that described in conjunction with FIG. 3. In this case, however, the exit port 35 empties into a reaction chamber 36 which is formed in the transparent plastic pouch by a seal 53 extending around the perimeter of the pouch, as shown. The reagents, in the form of solids or liquids, are contained in the pouches which are formed in the reaction chamber by rupturable seals 37 and 42. The reaction is initiated by squeezing the reaction chamber 36 until the liquid sample in it is forced against the rupturable seals causing them to rupture and discharge their contents into the reaction chamber. By alternatively protecting certain of the rupturable seals and rupturing others, the reagents can be introduced into the reaction chamber at the proper time. Once the reaction has been initiated, the contents of the reaction chamber can be analyzed in accordance with the method set forth in U.S. patent application Ser. No. 753,200 by E. P. Carter for Apparatus and Method for Performing Photometric Analysis. The system illustrated in FIG. 4 is a preferred system in many respects. Included amongst its advantages are that a separate bead column is associated with each test sample, and that the whole system, including the beads can be disposed of after the analysis is complete.

Example 1

FIG. 1 shows the effect of pore size upon the removal of an undesired substance, which is a protein in this example. Thirty-seven to seventy-five micron glass beads having the indicated pore sizes were tightly packed in a 9 cm. high column with an inner diameter of .5 cm. Rubber stoppers were applied at each end. The spaces within the pores and between the beads were filled with a tungstic acid solution containing 10 ml. distilled water, 10 ml. of 10% $Na_2WO_4 \cdot 2H_2O$, 0.05 ml. of concentrated $H_3PO_4$ and 25 ml. of 0.67 N sulfuric acid. A volume of 0.100 ml. of serum containing a total of 4.60 milligrams of protein was eluted onto the column. Subsequently the column was eluted with distilled water at the flow rates indicated in FIG. 1. The water elution was continued until a total of 5 ml. of precipitating agent, sample, and water, were collected. After 4% trichloroacetic acid was added to the eluted samples, the resulting turbidity was analyzed photometrically at 405 millimicrons. The graph indicates the results with the abscissa representing the pore sizes and the ordinate the amount of protein remaining in each sample after passing through the column. The graph shows that substantially total removal of the protein was effected for pore sizes within the range of 370 to 700 A. for both flow rates. Above 700 A., the slower flow rate of 2.28 ml. per minute allows appreciable quantities of protein to pass through the column; whereas the greater flow rate 4.75 ml. per minute shows no passage up to 1250 A. and only slight passage thereafter. This significantly better performance with the faster flow rate lends support to the conclusion that the pores function to creating turbulence within the flowing liquids and thus achieve greater mixing between them.

Example 2

Tests to show the effectiveness of porous beads in removing added portein were performed using an automated procedure and the pack of FIG. 4. The tests had as their objective the determination of the interference of proteins with uric acid analyses both with and without passing the sample with the proteins through a porous bead column containing a precipitating agent for the proteins.

Test packs similar to FIG. 4 for uric acid analysis were assembled placing in separate dimples 0.4 mg. $CuSO_4$, 2.0 mg. sodium bicinchoninate, and 120 mg. $K_2CO_2$. The headers 30 on the packs were the same as for Example 1 except that the precipitating agent contained 0.17 M $Na_2WO_4$, 0.112 N $H_2SO_4$, and 0.016 N $H_3PO_4$ in distilled water. Four to five milliliters of this reagent were eluted through each column prior to final pack assembly.

Four quantities of crystalline human alumin were dissolved in 5 milliliters of distilled water and inserted directly into the analytical test pack, thereby avoiding the glass bead protein removal columns. The concentrations of the albumin within the test pack are given in column 3 of Table 2. Column 4 of Table 2 indicates that these did not pass through the porous bead column.

Column 5 of Table 2 indicates the results of tests for *uric acid* performed on the samples, as determined on the Automatic Clinical Analyzer (manufactured by E. I. du Pont de Nemours and Company, Wilmington, Del.). In these tests, the above ingredients were added to the sample in the test pack and, after a few minutes, the differential absorption at 540 nm. less that at 470 nm. obtained.

The absence of any uric acid within the sample shows the resulting interference in the uric acid test caused by the proteins. Each of the figures in column 5 of Table 2 presents the average of two to three determinations.

For the fifth sample, 0.060 ml. of a solution containing 7 gm. percent of dissolved crystalline human albumin in distilled water were inserted into the column. This was eluted with distilled water until a total volume of 5.0 milliliters had collected within the test pack. Had none of the proteins been retained by the column, this would have given a protein concentration within the test pack of 84.0 mg. percent as indicated by the figure in parenthesis in column 3 of Table 2. Column 5 gives the results when the uric acid analysis was performed upon the sample. The results of these tests showed that the protein not removed by the column gave an indication of 0.20 mg. percent of uric acid. This corresponds very favorably with the results for the fourth sample in the immediately preceding line of Table 2. Had sample 4 started out as a 0.060 ml. sample followed by dilution to 5 milliliters within the test pack, as did sample 5, the original concentration of protein within sample 4 would have been exactly the same as that in sample 5, as indicated in the second column of Table 2. As the uric acid analysis for sample 4 gave a 6.25 mg percent indication, as compared to 0.20 mg. percent for sample 5, the porous glass protein removal column removed more than 8% of the interfering protein from sample 5.

The results for samples 4 and 5 take on particular significance in light of the fact that the 7 gm. percent protein in these samples closely approximate the protein concentration in human serum, while the 6.25 mg. percent interference of this protein in sample 4 is within the actual concentration range of uric acid in human serum, the upper normal limit being 8.0 mg. percent. Thus, without the removal of protein prior to uric acid analyses, this protein itself would give a uric acid indication which, when added to the uric acid actually present within the serum, would indicate an abnormally high condition. This would clearly invalidate this testing procedure. However, results for sample 5 show that the porous bead protein removal column will effectively remove sufficient protein to allow the uric acid analysis.

Example 3

The uric acid analytical test packs of Example 2 were used in a series of analyses performed upon human serum. All of the samples passed through the porous glass bead protein removal column. The Du Pont Automatic Clinical Analyzer was also used in these tests.

Uric acid analysis were also performed upon these same samples using the dialysis method for protein removal. Table 3 compares the results of these tests.

A correlation coefficient of 0.988 was obtained between these groups of data and is very close to the perfect correlation of 1.0. The graph of the porous glass bead method versus the dialysis method gave a line having a slope of 1.026 and an intercept of 0.238, indicating that the porous glass bead protein removal column results were, on the average, 0.238 mg. percent higher than that within the dialysis method.

Thus, the protein removal column effectively removes the proteins from biological samples. Further, the use of this column in uric acid analysis achieves results having a close correlation to the conventional laboratory method utilizing dialysis for protein removal.

TABLE II

| Sample | Protein conc. in sample, g. percent | Protein conc. in test pack, mg. percent | Protein removal column | Interference, mg. percent uric acid |
|---|---|---|---|---|
| 1 ..... Human albumin | | 1.4 | None | 0.05 |
| 2 ..... do | | 2.8 | ..... do | 0.30 |
| 3 ..... do | | 5.6 | ..... do | 0.65 |
| 4 ..... do | 7 | 84.0 | ..... do | 6.25 |
| 5 ..... do | 7 | (84.0) | Yes | 0.20 |

TABLE III

Porous glass bead column
(mg. percent uric acid):                           Dialysis
3.20 ------------------------------------------------ 2.9
3.30 ------------------------------------------------ 2.8
5.35 ------------------------------------------------ 4.7
9.70 ------------------------------------------------ 8.8
5.65 ------------------------------------------------ 5.8
3.05 ------------------------------------------------ 3.0
5.10 ------------------------------------------------ 4.8
3.10 ------------------------------------------------ 2.6
6.40 ------------------------------------------------ 5.7
6.35 ------------------------------------------------ 6.6
6.90 ------------------------------------------------ 7.1
7.10 ------------------------------------------------ 6.4
9.65 ------------------------------------------------ 9.2
6.40 ------------------------------------------------ 5.8
5.45 ------------------------------------------------ 5.4

We claim:

1. In an analytical test pack for performing chemical analysis of the type comprising a reaction compartment and prepackaged reagents, the improvement wherein said test pack comprises means for removing from a liquid sample a substance which will form a precipitate with some precipitating agent, said means comprising a receptacle at least a portion of which is filled with substantially rigid porous particles having a maximum dimension of about 37 to about 125 microns and a pore diameter of about 175 to about 1250 A., the spaces within said pores or the spaces between said particles containing a precipitating agent for said substance.

2. The device of claim 1 wherein said particles have a substantially spherical shape and are made of glass.

3. The device of claim 1 wherein, said substance to be removed being a protein, said precipitating agent is a liquid protein precipitating agent filling at least a portion of the spaces within said pores and the spaces between said particles.

4. The device of claim 3 wherein said protein precipitating agent is selected from the class consisting of organic solvents, aqueous solutions with high salt concentrations, aqueous solutions of heavy metal ions, or aqueous solutions of anionic precipitants.

5. An apparatus for automatically analyzing a liquid sample for a particular constituent when said liquid sample contains an interfering substance that would deleteriously affect the analysis, said interfering substance forming a precipitate with some precipitating agent, comprising:

(a) a means for removing said interfering substance containing a plurality of substantially rigid porous particles having a maximum dimension of about 37 to 125 microns and a pore diameter of about 175 to 1250 A., the space between said particles and the space within the pores of said particles being filled with a liquid precipitating agent for said interfering substance;

(b) a reaction chamber;

(c) a liquid handling means for removing a predetermined amount of liquid sample from a sample container and forcing said liquid sample through said particles into said reaction chamber;

(d) means for introducing at least one reagent into the liquid contained in said reaction chamber, said reagent being reactive with particular constituent in a manner such as to alter said liquid sample; and (e) means for determining the presence of said particular constituent.

6. The apparatus of claim 5 wherein, said interfering substance being a protein, said liquid precipitating agent is a protein precipitating agent selected from the class consisting of organic solvents, aqueous solutions of heavy metal ions, aqueous solutions with high salt concentrations, and aqueous solutions of anionic precipitants.

7. The apparatus of claim 6 wherein said means for determining the presence of said particular constituent is a photometric means.

8. The apparatus of claim 7 wherein said liquid handling means forces said liquid sample through said particles by introducing a quantity of diluent into said particles behind said liquid sample until said quantity of diluent completely displaces said liquid sample in said particles.

9. The apparatus of claim 8 wherein said liquid handling means comprises a pump forcing said liquid sample through said particles under a pressure of between about 1 to 100 p.s.i. and into said reaction chamber in about two minutes or less.

10. A method for automatically analyzing a liquid sample for a particular constituent when said sample contains an interfering substance which would deleteriously affect the analysis and which forms a precipitate with some precipitating agent comprising:

(a) forcing said liquid sample through a plurality of substantially rigid porous particles having a maximum diameter of about 37 to 125 microns and a pore diameter of about 175 to 1250 A., the spaces between said particles and the spaces within the pores of said particles being filled with a liquid precipitating agent for said interfering substance, and into a reaction chamber; and (b) determining the presence of said particular constituent.

11. The method of claim 10 wherein, the undesired substance being a protein, said precipitating agent is a protein precipitating agent selected from the group consisting of organic solvents, aqueous solutions having high salt concentrations, aqueous solutions of heavy metals, and aqueous solutions of anionic precipitants.

12. The method of claim 11 further comprising the step of introducing at least one reagent into said reaction chamber, said reagent being reactive with said particular constituent in a manner such as to alter the photometric density of said liquid sample, and wherein the determination of the presence of said particular constituent is accomplished photometrically.

13. The method of claim 11 wherein the step of forcing said liquid sample through said particles is accomplished by introducing said liquid sample into said particles, and forcing a quantity of diluent through said particles behind said liquid sample until said quantity of diluent completely displaces said liquid sample in said particles.

14. The method of claim 11 wherein the determination of the presence of said particular constituent is accomplished photometrically.

15. The method of claim 14 further comprising the step of introducing at least one reagent into said reaction chamber, said reagent being reactive with said particular constituent in a manner such as to alter the physical properties of said liquid sample.

16. The method of claim 14 wherein said liquid sample is forced through said particles under a pressure of between about 1 and 100 p.s.i. and into said reaction chamber in about two minutes or less.

References Cited

UNITED STATES PATENTS

| | | | |
|---|---|---|---|
| 2,174,349 | 9/1939 | Littlefield | 23—232 R |
| 2,736,638 | 2/1956 | McConnaughey | 23—232 R |
| 3,476,515 | 11/1969 | Johnson et al. | 23—230 R |
| 3,493,503 | 2/1970 | Mass | 23—230 B X |
| 3,519,390 | 7/1970 | Dickey et al. | 23—230 B |
| 3,672,845 | 6/1972 | Verbeck | 23—253 TP |

OTHER REFERENCES

Samuelson, O.: Ion Exchange Separations in Analytical Chemistry, 1963, pp. 162–169.

ROBERT M. REES, Primary Examiner

U.S. Cl. X.R.

23—230 B, 253 R